(12) United States Patent
Mazzer

(10) Patent No.: US 10,407,908 B2
(45) Date of Patent: Sep. 10, 2019

(54) HIGH-PERFORMANCE TORCHABLE THERMAL INSULATING PANEL FOR BUILDINGS ROOFS

(71) Applicant: IWIS INSULATION WATERPROOFING INDUSTRIAL SYSTEMS S.R.L., Vittorio Veneto (IT)

(72) Inventor: Luciano Mazzer, Conegliano Veneto (IT)

(73) Assignee: IWIS Insulation Waterproofing Systems, Vittorio Veneto (IT)

( * ) Notice: Subject to any disclaimer, the term of this patent is extended or adjusted under 35 U.S.C. 154(b) by 0 days.

(21) Appl. No.: 15/543,259

(22) PCT Filed: Jan. 15, 2015

(86) PCT No.: PCT/IB2015/000025
§ 371 (c)(1),
(2) Date: Jul. 13, 2017

(87) PCT Pub. No.: WO2016/113581
PCT Pub. Date: Jul. 21, 2016

(65) Prior Publication Data
US 2018/0002927 A1 Jan. 4, 2018

(51) Int. Cl.
*B32B 27/12* (2006.01)
*B32B 11/10* (2006.01)
(Continued)

(52) U.S. Cl.
CPC .............. *E04C 2/296* (2013.01); *E04D 3/352* (2013.01); *E04D 13/16* (2013.01); *B32B 7/12* (2013.01);
(Continued)

(58) Field of Classification Search
CPC ........... E04D 5/10; E04D 1/20; E04D 12/002; E04D 1/30; E04D 1/22; E04D 1/28;
(Continued)

(56) References Cited

U.S. PATENT DOCUMENTS 3,193,439 A * 7/1965 Price .................... E04D 5/10
428/139
3,466,222 A * 9/1969 Curtis .................. E04B 1/941
428/142
(Continued)

FOREIGN PATENT DOCUMENTS

CN 202787536 U 3/2013
DE 1559358 A1 8/1969
(Continued)

OTHER PUBLICATIONS

International Search Report for corresponding International Application No. PCT/IB2015/000025.

*Primary Examiner* — Phi D A
(74) *Attorney, Agent, or Firm* — Egbert Law Offices, PLLC

(57) ABSTRACT

Separating membrane of plastic material, made up of a bossed and waterproof sheet which is coupled with a permeable base layer. The bosses are of the cylindrical type with a double diameter and have such a shape and arrangement as to feature improved adhesion on both faces. The gripping of the adhesive is increased in order to obtain greater tear strength, on the upper face, and at the same time increases the area of contact with the base layer for a greater resistance to delamination on the lower face. In particular, inside each chamber there is an internal crown, which divides it like a necking into two superimposed compartments having the same diameter, wherein the first compartment has a depth amounting to at least ⅓ of the total. A (Continued)

production process for obtaining the membrane is also disclosed.

11 Claims, 1 Drawing Sheet

(51) Int. Cl.
*E04D 1/20* (2006.01)
*E04C 2/296* (2006.01)
*E04D 3/35* (2006.01)
*E04D 13/16* (2006.01)
E04D 5/10 (2006.01)
E04B 1/80 (2006.01)
E04D 11/02 (2006.01)
E04B 1/76 (2006.01)
B32B 7/12 (2006.01)

(52) U.S. Cl.
CPC ............... *B32B 27/12* (2013.01); *E04B 1/80* (2013.01); *E04B 2001/7691* (2013.01); *E04D 3/35* (2013.01); *E04D 5/10* (2013.01); *E04D 11/02* (2013.01)

(58) Field of Classification Search
CPC .. E04D 13/16; E04D 3/35; E04D 5/06; B32B 2419/06; B32B 2395/00; B32B 11/10; B32B 2307/7265; B32B 27/12; B32B 5/26; B32B 11/04; B32B 2307/304; B32B 2419/00; B32B 15/20; B32B 2260/021; B32B 2307/416; B32B 2307/546; B32B 27/32; B32B 27/36; B32B 5/022; B32B 15/14; B32B 2307/712; B32B 27/30; B32B 27/306; B32B 7/04; B32B 11/00; B32B 17/1077; B32B 37/203; E04B 1/665; E04B 1/84

See application file for complete search history.

(56) References Cited

U.S. PATENT DOCUMENTS

| | | | | |
|---|---|---|---|---|
| 3,694,306 A * | 9/1972 | Fricklas | ................. | E04B 1/941 428/341 |
| 4,357,377 A * | 11/1982 | Yamamoto | .............. | B32B 11/02 428/40.3 |
| 4,473,610 A * | 9/1984 | Davis | ....................... | B32B 15/08 428/143 |
| 4,729,926 A * | 3/1988 | Koteles | ................... | B32B 27/08 428/474.7 |
| 4,774,148 A * | 9/1988 | Goto | ....................... | B32B 15/04 428/607 |
| 4,900,616 A * | 2/1990 | Weir | ......................... | B32B 5/18 428/316.6 |
| 4,944,818 A * | 7/1990 | Dybsky | ................... | B32B 11/02 156/71 |
| 5,411,352 A * | 5/1995 | Eren | ...................... | E01C 13/065 404/31 |
| 7,923,107 B2 * | 4/2011 | Thomas | ................. | B32B 15/12 156/279 |
| 8,056,292 B2 * | 11/2011 | Swanson | ................. | E04F 15/182 472/92 |
| 8,241,728 B2 * | 8/2012 | Guerra | .................... | B32B 11/08 428/150 |
| 9,267,285 B2 * | 2/2016 | Tauferner | .................. | B32B 5/02 |
| 2004/0013854 A1 * | 1/2004 | Zanchetta | ................. | B32B 3/30 428/156 |
| 2004/0014382 A1 * | 1/2004 | MacAulay | .......... | B29C 44/1228 442/23 |

FOREIGN PATENT DOCUMENTS

| | | |
|---|---|---|
| FR | 1362853 A | 6/1964 |
| FR | 2021581 A1 | 7/1970 |
| FR | 2457992 A1 | 12/1980 |
| FR | 2522347 A1 | 9/1983 |

* cited by examiner

HIGH-PERFORMANCE TORCHABLE THERMAL INSULATING PANEL FOR BUILDINGS ROOFS

The present invention relates to a high-performance torchable thermal insulating panel for buildings roofs.

The present invention finds particular but not exclusive application in the sector of the industry of production and marketing of insulating panels for building and more widely in the industry of production and marketing of products for the building sector.

In the realization of buildings, be they for residential, trade or industrial purposes, the building requirements determined by the need to have, as far as possible, a greater energy saving mainly given by the reduction in the heat loss of the building, in particular of its external casing by using technical means able to make insulation more efficient, have led to a growing increase in the industry linked to the creation and to the development of suitable insulating materials. In particular, as far as residential buildings are concerned, such a need for energy efficiency has recently increased significantly also due, on the one side, to the need for limiting the costs for internal air conditioning and, on the other side, to the provision of public incentives aimed at allowing for the energy requalification of existing buildings, as well as to the issue of regulations aimed at establishing suitable energy efficiency parameters when constructing new buildings. Finally, the need to carry out the thermal insulation of buildings derives from the technical evidence coming from the ascertainment that the structures of which the building is made up undergo heat loss in different measure, both those constituting the opaque casing of the building and those constituting the transparent surfaces. As for the percentages of average heat loss through the casing of the building, it has been ascertained that the heat loss involving the loft and/or the roof of a building affects on the whole the heat loss of the building itself by an average percentage of 25% of the total, thus making it important to carry out an optimal thermal insulation. Schematically and as a first approximation, the roofs of buildings can be typologically divided, according to their slopes, into flat roofs and pitched roofs, and, according to the roof covering, into discontinuous roofs and continuous roofs, the first being characterized by features according to which the roof covering is made by connecting to each other covering elements such as tiles, pantiles, slabs of stone or cement material or of another known material; the roofs of the continuous type are characterized in that the roof covering is made by joining large covering elements such as panels of metal, plastic materials or sheaths, said type of covering lending itself to make different roof shapes. Furthermore, the roof of a building is traditionally made by a multi-layer structure generally comprising at least: the load-bearing structure, the insulation, the water-tightness, the ventilation and the roof covering. As for the object of the present invention, the thermal insulating layer, whose function is to increase the insulation of the roof limiting thermal transfer, is made by arranging and laying suitable elements of thermal insulating material, arranged for this purpose, which according to the type of material of which they are made can be divided into: thermal insulating materials of natural vegetable origin such as wooden fibres, hemp fibres, coconut fibres, mineralized wooden fibre, cork; thermal insulating materials of mineral origin such as expanded clay, expanded perlite, rock wool, glass wool, vermiculite; thermal insulating materials of synthetic origin, multi-layer heat-reflecting insulating materials such as expanded polystyrene, extruded expanded polystyrene, polyurethane etc. For the purpose of facilitating their positioning, many of said materials are made in the form of slabs or panels. With particular reference to the present invention, particularly interesting are the thermal insulating polyurethane materials, in particular rigid polyurethane foams (PUR), which at present are widely used as thermal insulating materials for building. In general, polyurethanes are a class of polymers obtained following a reaction between diisocyanates or polyisocyanates with diols or polyols, where, depending on the reaction conditions and on the structure and proportion of the components, one can obtain a range of products among which particularly interesting are the rigid foams which lend themselves to the production of thermal insulating panels. In particular, closed-cell rigid polyurethane foams lend themselves to be shaped into panels thanks to their relatively low deformability. More performing in terms of thermal insulation are the polyisocyanurates (PIR), which can be obtained in the form of rigid foam materials able to be shaped into slabs or panels. Essential to obtain polyurethane materials intended to be used as thermal insulating materials are the blowing agents, be they physical or chemical, as they are directly involved in obtaining the particular cell structure of the foam materials given by the formation of gas bubbles during the polymerization process, which determine the cell structure of the mixture, the determination of the blowing agent influencing the heat conductivity of the material produced. As known, in the production of thermal insulating panels the heat conductivity factor is of essential importance as it directly affects the future yield of the insulation carried out. Heat conductivity, being usually determined by means of a heat conductivity meter measuring the heat flow that crosses an area of a panel having a given thickness at a given temperature. Owing to their low heat conductivity, polyurethane foams at present are the materials which are mostly used as thermal insulating materials, since the solid material of which they are made represents a very low percentage of the volume, usually amounting to about 3% of the volume, the remaining part consisting of gas. In this way, as gases have a much lower heat conductivity than solids, as a consequence the foam materials have significantly lower heat conductivity values than what may be the heat conductivity given by a solid made up of the same material. As for heat transfer in polyurethane foams, considering that heat transfer in a cell material occurs by conduction through the solid, by conduction through the gas, by irradiation and by convection, if the thickness of the polyurethane foam panel is sufficient, within the heat transfer the conduction of the solid and of the gas are added together, to this adding the radiative contribution. In this way it is known that the heat conductivity of polyurethane foams is directly affected by the fact that the conductive contribution through the solid and the radiative contribution are constant in time, while the heat contribution due to the conduction through the gas is strictly dependent on the relevance of the diffusion phenomena of migration of the gas contained in the cells. Being also known that the heat conductivity of polyurethane foams in time and, therefore, their insulating power, is directly affected on the one side by the diffusion of the gas towards the external environment, and on the other side by the counter-diffusion of the external atmosphere towards the inside of the foam material, in the absence of means able to eliminate or at least to reduce said phenomenon, a decrease in the insulating power of the foam material in time is predictable.

Prior Art

Also the known prior art, as in the currently available patent literature and known solutions of thermal insulating panels available on the market, in particular for buildings roofs, discloses some solutions of thermal insulating panels intended to constitute the thermal insulating covering of buildings roofs.

Among the solutions found, for example we would like to mention the following:

D1: JP 2008144494
D2: CN201874162
D3: CN2813752
D4: PL55695
D5: IT275821 (Stiferite)

D1 synthetically describes a thermal insulating panel solution for roof pitches and the related assembly method, wherein the thermal insulating panel comprises, arranged at the centre, a reinforcing rectangular metal sheet. The thermal insulating panel also comprises a layer of thermal insulating material consisting of polyurethane foam, said layer being placed on top of said reinforcing layer, under which the thermal insulating panel according to the invention comprises a further thermal insulating layer consisting of polyurethane foam. A through-hole is made in correspondence of a given zone of the reinforcing layer, in correspondence of said through-hole there being some corresponding openings in the thermal insulating layers of polyurethane foam, in such a way that a fixing device, passing through said hole, is able to be anchored by means of a fixing bolt to an anchorage element with which the roof pitch is provided.

D2 synthetically describes a thermal insulating panel solution for flat or pitched roofs which are particularly used for the thermal insulation of a building roof. The thermal insulating panel according to the described solution comprises a base layer, a watertight layer, an upper protection layer and a lower protection layer, wherein the base layer is a polystyrene foam; the watertight layer being included between the upper protection layer and the base layer; wherein the lower protection layer is placed opposite to the base layer; wherein the base layer, the watertight layer, the upper protection layer and the lower protection layer are fixedly placed. The thermal insulating panel according to the solution, in the applicant's opinion, has the advantages of being more thermal insulating, watertight and fireproof than the traditional thermal insulating panels.

D3 synthetically describes a thermal insulating and fireproof composite panel solution intended for the insulation of buildings roofs and walls, said thermal insulating composite panel comprising an upper layer of lightened aggregate material, a reinforcing layer and a lower layer of lightened aggregate material, wherein the reinforcing layer is placed between the upper layer of lightened aggregate material and the lower layer of lightened aggregate material. Both the upper and lower layers of lightened aggregate material are made up of a composite material of polystyrene foam and cement. The reinforcing layer is made up of a steel wire mesh or of an iron wire mesh or of a fibreglass mesh.

D4 synthetically describes a thermal insulating panel solution for buildings roofs comprising a mineral wool felt and a watertight supporting coating. The panel according to the invention, in correspondence of the surface of the felt on which the watertight coating is adhesively applied, is provided with recesses distributed on the whole surface of the panel, which have the purpose of acting as anchorage points for the adhesive of the watertight coating. Said recesses are obtained by needle punching, and the panel according to the invention can be used both in the insulation of buildings roofs of the flat type and in the insulation of pitched roofs.

D5 synthetically describes an improved insulating panel solution, for roofs and walls, of the type comprising a body of polyurethane foam, or of another equivalent material, into which some crosspieces are incorporated, which develop in thickness affecting only partially the thickness of the body of polyurethane foam, and are flush with one of its faces, said body of polyurethane foam being completed by a first protection layer, which is intended to be facing outwards with respect to the roof or wall with which it is associated, and by an internal second protection layer, said improved insulating panel being characterized in that said first protection layer is impermeable to water in the direction from outside inwards and is permeable to steam in the direction from inside outwards.

Furthermore, known on the market are solutions of thermal insulating panels made of polyurethane foam among which we mention the panels commercially called RF8 produced by the Isolparma® company, wherein on the website www.isolparma.it solutions of thermal insulating panels of the sandwich type are illustrated, which are made up of an insulating component of expanded polyiso foam without using CFC or HCFC, coated on the upper face with bitumen coupled with PPE, suitable for the application by torching, and on the lower face with saturated mineral fibre. Said panels are intended for the thermal insulation of exposed bituminous watertight sub-covering roofs and where a high resistance to torching is required.

Other solutions of thermal insulating panels for buildings roofs known on the market are those made and distributed by the Stiferite® company, as on the website www.stiferite.com, commercially called: Stiferite® GT, which refers to a thermal insulating panel made up of a layer of thermal insulating material of rigid expanded polyiso foam (PIR) provided on both faces with a Duotwin® barrier coating; Stiferite® GTE, which refers to a sandwich panel made up of an insulating component of expanded polyiso foam without using CFC or HCFC, coated on both faces with a gas-tight coating of multi-layer aluminium, declaring that the panel is not suitable for direct torching; Stiferite® GT3, which is made up of a layer of thermal insulating material of rigid expanded polyiso foam (PIR) which is provided on both faces with a Duotwin® barrier coating and on which one can later apply a bitumen polymer membrane reinforced with glass veil; Stiferite® GT4, which is made up of a layer of thermal insulating material of rigid expanded polyiso foam (PIR) which is provided on both faces with a Duotwin® barrier coating on which one can later apply a bitumen polymer membrane reinforced with non-woven polyester fabric; Stiferite® GT5, which is made up of a layer of thermal insulating material of rigid expanded polyiso foam (PIR) which is provided on both faces with a Duotwin® barrier coating on which one can later apply a bitumen polymer membrane reinforced with a non-woven polyester fabric with a slate chip finish.

Drawbacks

All the known solutions of thermal insulating panels in particular for buildings roofs as in the found prior art have, although to a different extent, defects or limits.

A first limit involving all the solutions of thermal insulating panels as in the known prior art, in the applicant's opinion, lies in the fact that said solutions are not optimized in terms of maintaining in time the thermal insulating characteristics of the material of which the panel is mainly made up, said drawback being particularly evident in the solutions as in the found prior art D1 to D5, none of said solutions providing a coating able to ensure the gas-tightness of the layer of insulating material and the simultaneous possibility of torching for the application of thermoplastic membranes. In the same way, also the solutions of thermal insulating panels as in the Isolparma® and Stiferite® proposals, in the applicant's opinion, which use rigid poliurethane foam (PIR) as an insulating layer, have the drawback of not performing an optimal gas-tightness of the panel there not being the possibility to carry out a torching process directly on the coating. In particular the Isolparma® solution does not provide any gas-tight coating providing, however, the possibility of torching given by the coating of bituminized glass veil coupled to PPE, which however, in the applicant's opinion, is not optimized for the purpose of the adhesion of thermoplastic membranes. In the applicant's opinion, also the solutions Stiferite® GT and GTE, although the insulating layer of the panel is provided with a barrier coating, do not allow to perform an optimal gas-tightness because of the composition of the barrier coating itself, which does not seem to be optimized to ensure an as far as possible complete gas-tightness; a further limit of said solutions lies in the fact that they cannot be torched. Furthermore, in the solutions Stiferite® GT3, GT4 and GT5, the bitumen polymer membrane is not part of the coating as it is associated with the coating of the panel if necessary only in a following processing phase and in any case after the production of the panel, it being provided that said membrane, if it is associated with the panel, is associated in correspondence of one face only, as far as one can see, by means of side selvedges. In this way, said panel solutions as they are marketed do not provide one single coating which allows to integrate the conditions of gas-tightness and of torching.

A second limit involving all the solutions of thermal insulating panels as in the known prior art found, in the applicant's opinion, lies in the fact that said solutions, in particular the solutions providing the use of a polyurethane foam as an insulating material, also in the case in which they are provided with coating layers, do not allow to realize a thermal insulating panel by which it is possible to obtain at the same time an optimal gas-tightness and an optimal adhesion to the direct coupling by torching of the thermoplastic membranes usually employed in the making of the multi-layer structure of a building roof.

A third limit involving all the solutions of thermal insulating panels as in the known prior art found, in the applicant's opinion, lies in the fact that said solutions, in particular the solutions providing the use of a polyurethane foam as an insulating material, also in the case in which they are provided with coating layers, do not allow to realize a thermal insulating panel which can be torched on both opposite faces having a greater surface area, said solutions thus being disadvantageous not only due to the greater attention required from the person in charge of laying, but also due to the possibility that any positioning errors may jeopardize the insulating power of the panel if the heat transmitted by the flame application of the thermoplastic membranes damaged the face of the thermal insulating panel on which torching is not possible.

Another limit involving all the solutions of thermal insulating panels as in the known prior art found, in the applicant's opinion, lies in the fact that said solutions, in particular the solutions providing the use of a polyurethane foam as an insulating material, also in the case in which they are provided with coating layers, do not efficiently counteract the deformations of the panel in time.

Therefore, there is the need for the companies of the sector to find some optimal solutions for obtaining the following aims.

SUMMARY OF THE OBJECT OF THE INVENTION

These and other aims are achieved by the present invention according to the characteristics as in the appended claims by solving the mentioned problems by means of a high-performance torchable thermal insulating panel (1) for buildings roofs made up of a layer of thermal insulating material of rigid polyurethane foam (PUR) or of another equivalent material and in particular and preferably of polyisocyanurate (PIR) in the form of a panel being made up of an intermediate insulating layer (2) preferably parallelepiped-shaped with flat faces, said intermediate insulating layer (2) being provided, at least in correspondence of the two opposite faces having a greater surface area, with a multi-layer coating (3) made up at least of the following layers: a) a layer of metallized polyester film; b) a layer of polyethylene film; c) a layer of moisture-proof paper; d) a layer of bituminous compound film; e) a layer of non-woven polypropylene fabric.

Aims

By the considerable creative contribution the effect of which constitutes an immediate technical progress several aims and advantages are achieved.

A first advantageous aim of the present invention is to obtain a high-performance torchable thermal insulating panel for buildings roofs by which it is possible, thanks to an innovative multi-layer coating, to combine into one single thermal insulating panel some optimized gas-tightness characteristics with an improved and optimal possibility of applying by flame torching the thermoplastic membranes of common use in the making of the multi-layer structure of buildings roofs.

A second advantageous aim of the present invention is to obtain a high-performance torchable thermal insulating panel for buildings roofs by which it is possible, due to the particular structure of the thermal insulating panel and particularly due to an innovative multi-layer coating, to keep the thermal insulating characteristics of the layer of insulating material unchanged in time, at the same time ensuring the non-deformability of the panel in time.

A third advantageous aim of the high-performance torchable thermal insulating panel for buildings roofs according to the present invention consists, particularly thanks to the positioning of the innovative multi-layer coating on both faces of the thermal insulating panel, of the possibility to prevent the risk that a wrong positioning of the thermal insulating panel may damage the insulating qualities of the panel as a consequence of the application by flame torching of the thermoplastic membranes usually employed in the making of the multi-layer structure of buildings roofs, thus simplifying the laying operations and significantly reducing times.

These and other advantages will appear from the following detailed description of some preferred embodiments whose details of execution are not to be considered limitative.

CONTENT OF THE DRAWINGS

PRACTICAL EMBODIMENT OF THE INVENTION

Figure 1:
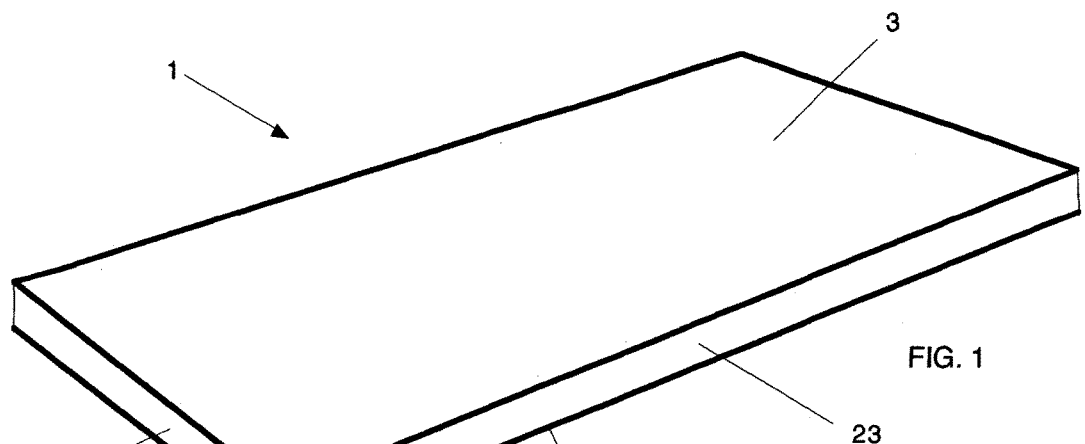
FIG. 1 shows a perspective view of the high-performance torchable thermal insulating panel for buildings roofs according to the present invention.
Figure 2:
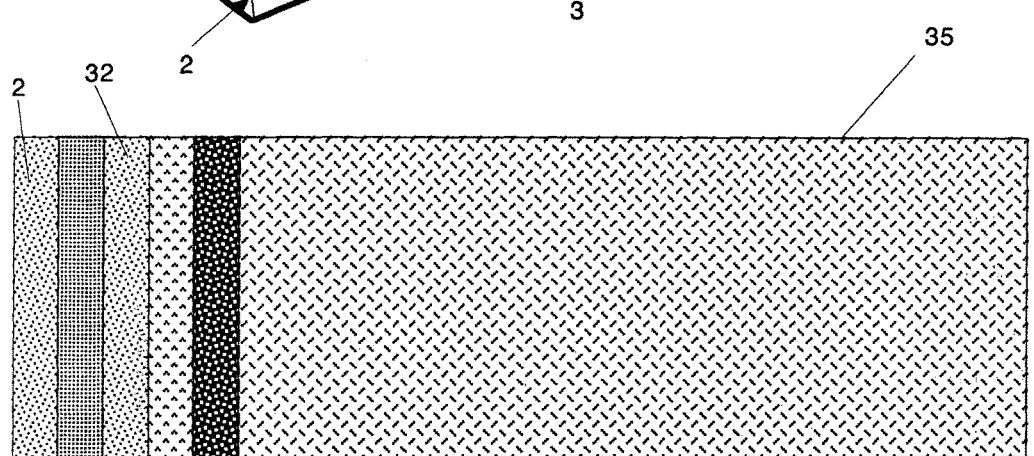
FIG. 2 shows a plan view from above of the high-performance torchable thermal insulating panel for buildings roofs according to the present invention in which the various layers making up the panel and the multi-layer coating are presented.
Figure 3:
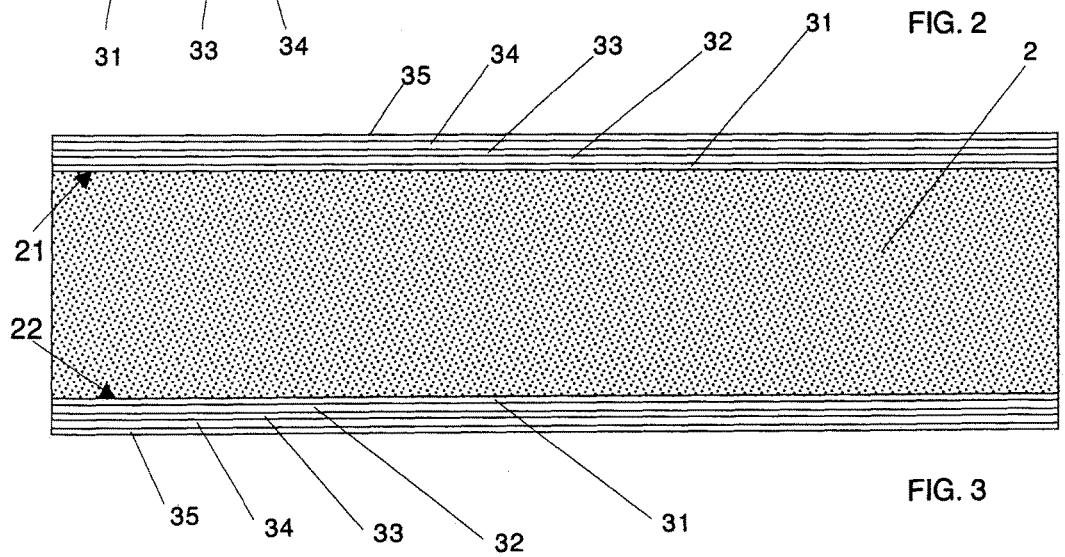
FIG. 3 shows a front side view of the high-performance torchable thermal insulating panel for buildings roofs according to the present invention in which the various layers making up the panel and the multi-layer coating are presented.

Referring without limits also to the content of the drawings as from the representations as in FIGS. 1 to 3, a high-performance torchable thermal insulating panel (1) for buildings roofs is described which in the embodiment described, which is a preferred solution as from the representations as in FIGS. 2 to 3, consists of a multi-layer sandwich comprising an intermediate insulating layer (2) of thermal insulating material which forms a shaped body of rigid polyurethane foam (PUR), or of an equivalent material, preferably providing that the thermal insulating material of which the intermediate insulating layer (2) of the thermal insulating panel (1) according to the present invention is made up is rigid polyisocyanurate foam (PIR), polyiso, given the high thermal insulation characteristics of the latter. In the embodiment described and preferably, the intermediate insulating layer (2) forms a parallelepiped-shaped body with flat faces in which the upper face (21) and the parallel, opposite and symmetrical lower face (22) are rectangular and have a greater surface area with respect to the remaining side faces (23) which delimit the perimeter of the thermal insulating panel (1), the distance between the upper face (21) and the lower face (22) being equal to the thickness of the intermediate insulating layer (2), the determination of said thickness directly influencing the thermal yield of the whole thermal insulating panel (1). Although it is preferable that the shape of the intermediate insulating layer (2) is, as described, a parallelepiped, it is provided that the shape of the intermediate insulating layer (2) which directly determines the overall shape of the thermal insulating panel (1), can be different from a parallelepiped provided that it enables the adjacent positioning of the thermal insulating panels (1) when laid to constitute the insulating roofing of the building roof.

The thermal insulating panel (1) according to the present invention, both in correspondence of the upper face (21) and in correspondence of the lower face (22) is provided with a multi-layer coating (3) which covers up completely the surface area of the upper face (21) and of the lower face (22) of the intermediate insulating layer (2) with which it is associated. The association of the multi-layer coating (3) with the upper face (21) and with the lower face (22) of the intermediate insulating layer (2) of the thermal insulating panel (1) occurs according to the prior art during the production phase of the latter, preferably using the adhesive properties of the polyurethane foam of the intermediate insulating layer (2).

In more detail of the embodiment described, as represented in FIGS. 2 to 3, the multi-layer coating (3) is made by coupling a multitude of layers of material each with specific technical features. In particular, it is provided that the multi-layer coating (3) is made by coupling at least the following layers:

a) a first layer (31), which is provided to be the one that will be directly in contact, being associated with it, with the upper face (21) and with the lower face (22) of the intermediate insulating layer (2), said first layer (31) consisting of a metallized polyester film having a thickness preferably between 10 microns and 30 microns, the optimal thickness of the metallized polyester film making up the first layer (31) being of 12 microns with a grammage of 17 g/m$^2$ (grams per square meter). The first layer (31) making up the multi-layer coating (3) is made for the purpose of arranging a first barrier layer that opposes the spreading of the gas which in time is released from the intermediate insulating layer (2) towards the external environment and simultaneously the counter-spreading of the external atmosphere towards the inside of the intermediate insulating layer (2) itself. The metallized polyester film used for the purpose of making the first layer (31) of the multi-layer coating (2) is of the known type and consists of a polyester film which is subjected to a metallization process consisting, as known, in arranging a very thin aluminium layer on the flexible polymer substrate made up of the polyester film, said process being carried out in a known way by means of a metallizing device in which one carries out the evaporation/sublimation of the metal in a vacuum condition while making pass the flexible polymer substrate made up of the polyester film.

b) a second layer (32), coupled according to a known art to said first layer (31), consisting of a polyethylene film, of the known type, having a grammage preferably between 10 g/m$^2$ and 14 g/m$^2$, the optimal grammage corresponding to 12 g/m$^2$.

c) a third layer (33), coupled according to a known art to said second layer (32), consisting of a sheet of moisture-proof paper, of the known type, having a grammage preferably between 100 g/m$^2$ and 140 g/m$^2$, the optimal grammage corresponding to 120 g/m$^2$.

d) a fourth layer (34), coupled according to a known art to said third layer (33), consisting of a film of bituminous compound, of the known type, having a grammage preferably between 200 g/m$^2$ and 2500 g/m$^2$, the optimal grammage corresponding to 250 g/m$^2$. The bituminous compound constituting the fourth layer (34) is a polymeric bitumen of the known type obtained by mixing a bitumen and a polymer in such a way that the polymer component, which is notoriously added to the bitumen in a weight percentage definitely lower than that of the bitumen, is however intended to substantially modify the mechanical behaviour of the bitumen improving its characteristics. The fourth layer (34) is made for the purpose both of ensuring in any case a high degree of water-tightness of the thermal insulating panel (1) and for the purpose of facilitating the adhesion of the known thermoplastic membranes applied by flame torching which are traditionally arranged for covering the thermal insulating roofing in the realization of the multi-layer structure of the roof.

e) a fifth layer (35), coupled according to a known art to said fourth layer (34), consisting of a non-woven polypropylene fabric, of the known type, having a grammage preferably between 20 g/m$^2$ and 50 g/m$^2$, the optimal grammage corresponding to 40 g/m$^2$.

In this way, the multi-layer coating (3) with which the intermediate insulating layer (2) of the thermal insulating panel (1) according to the present invention is provided, carries out in an innovative way the function of enabling the gas-tightness of the intermediate insulating layer (2), realizing a gas-tight barrier which effectively opposes the spreading of the gas which in time is released from the intermediate insulating layer (2) towards the external environment and simultaneously the counter-spreading of the external atmosphere towards the inside of the intermediate insulating layer (2) so as to allow for the duration in time of the thermal insulating characteristics of the intermediate insulating layer (2). Furthermore, the multi-layer coating (3) with which the intermediate insulating layer (2) of the thermal insulating panel (1) according to the present invention is provided, also carries out the function of enabling an improved and easy adhesion of the thermoplastic membranes applied by flame torching which are traditionally arranged for the water-tightness of the building roof.

In more detail of the embodiment described, the thermal insulating panel according to the present invention, thanks to its innovative structure and in particular thanks to the provided constitution of the multi-layer structure which makes up the multi-layer coating, allows to carry out both the gas-tightness function and the function of making the thermal insulating panel (1) torchable. The first function, i.e. gas-tightness, carried out by the multi-layer coating (3) according to the invention, is carried out in particular by the coupling: of the first layer (31) consisting of the metallized polyester film; of the second layer (32) consisting of the polyethylene film; and of the third layer (33) consisting of the moisture-proof paper sheet. Furthermore, the second function, consisting of the facilitation and of the improvement of adhesion, by means of torching, to the thermal insulating panel (1) of the thermoplastic membranes used in the making of buildings roofs, which function is also enabled in particular by the multi-layer coating (3) according to the invention, is carried out in particular by coupling the fourth layer (34), consisting of the bituminous compound film, to the fifth layer (35) consisting of the non-woven polypropylene fabric. Furthermore, the particular structure of the multi-layer coating (3) is such as to effectively counteract the deformation tendency of the intermediate insulating layer providing the thermal insulating panel with a suitable shape and dimensional stability.

An alternative solution to the previous solution of a thermal insulating panel (1), which is reasonably subject to lower realization costs, consists of a multi-layer coating (3) which is substantially made up of three layers instead of the five layers provided. More particularly said multi-layer coating (3) comprises:
- at least one layer consisting of a metallized polyester film, said metallized polyester film having a thickness between 10 microns and 30 microns;
- at least one layer consisting of a polymer bitumen film having a grammage between 200 grams per square meter and 2500 grams per square meter;
- a layer consisting of a non-woven polypropylene fabric, wherein the layer consisting of the metallized polyester film is coupled to the intermediate insulating layer (2), said non-woven polypropylene fabric having a grammage between 20 grams per square meter and 50 grams per square meter.

REFERENCE (1) Thermal insulating panel
(2) intermediate insulating layer
(21) upper face
(22) lower face
(23) side faces
(3) multi-layer coating
(31) first layer
(32) second layer
(33) third layer
(34) fourth layer
(35) fifth layer

The invention claimed is:

1. A thermal insulating panel for a roof of a building, the thermal insulating panel comprising:
   an intermediate layer of rigid polyurethane foam having an upper face and a lower face;
   a first multi-layer coating coupled to the upper face of said intermediate layer; and
   a second multi-layer coating coupled to the lower face of said intermediate layer, each of said first and second multi-layered coatings being gas-tight, each of said first and second multi-layered coatings comprising layers arranged sequentially from the intermediate layer as follows:
   a layer of metallized polyester film;
   a layer of polyethylene film;
   a layer of moisture-proof paper;
   a layer of film of a bituminous compound of polymer bitumen; and
   a layer of a non-woven polypropylene fabric, wherein said layer of metallized polyester film is affixed to said intermediate insulating layer.

2. The thermal insulating layer of claim 1, wherein said layer of metallized polyester film has a thickness between 10 microns and 30 microns.

3. The thermal insulating layer of claim 1, wherein said layer of polythylene film has a density of between 10 grams per square meter and 14 grams per square meter.

4. The thermal insulating layer of claim 1, wherein said layer of moisture-proof paper has a density of between 100 grams per square meter and 140 grams per square meter.

5. The thermal insulating layer of claim 1, wherein said layer of film of the bituminous compound has a density between 200 grams per square meter and 2500 grams per square meter.

6. The thermal insulating layer of claim 1, wherein said layer of the non-woven polypropylene fabric has a density of between 20 grams per square meter and 50 grams per square meter.

7. The thermal insulating layer of claim 1, wherein said layer of metallized polyester film has a thickness of 12 microns and a density of 12 grams per square meter.

8. The thermal insulating layer of claim 1, wherein said layer of polyethylene film has a density of 12 grams per square meter.

9. The thermal insulating layer of claim 1, wherein said layer of the moisture-proof paper sheet has a density of 120 grams per square meter.

10. The thermal insulating layer of claim 1, wherein said layer of the film of the bituminous compound has a density of 250 grams per square meter.

11. The thermal insulating layer of claim 1, wherein said layer of the non-woven polypropylene fabric has a density of 40 grams per square meter.

* * * * *